United States Patent
Walker et al.

(10) Patent No.: US 11,037,460 B2
(45) Date of Patent: Jun. 15, 2021

(54) COGNITIVE ROBOTIC ASSISTANCE FOR EDUCATION

(71) Applicant: International Business Machines Corporation, Armonk, NY (US)

(72) Inventors: Keith R. Walker, Austin, TX (US); James E. Bostick, Cedar Park, TX (US); Danny Y. Chen, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 16/000,133

(22) Filed: Jun. 5, 2018

(65) Prior Publication Data
US 2019/0371195 A1    Dec. 5, 2019

(51) Int. Cl.
*G09B 7/04* (2006.01)
*G06N 3/00* (2006.01)

(52) U.S. Cl.
CPC .............. *G09B 7/04* (2013.01); *G06N 3/006* (2013.01)

(58) Field of Classification Search
CPC ....................................................... G09B 7/04
See application file for complete search history.

(56) References Cited

U.S. PATENT DOCUMENTS

| | | |
|---|---|---|
| 2014/0272908 A1 | 9/2014 | Black |
| 2015/0099255 A1* | 4/2015 | Aslan ..................... G06Q 50/01 434/350 |
| 2015/0125842 A1 | 5/2015 | Shim et al. |
| 2016/0063883 A1 | 3/2016 | Jeyanandarajan |
| 2016/0203726 A1 | 7/2016 | Hibbs et al. |
| 2018/0113509 A1* | 4/2018 | Kim ........................ H04W 4/38 |

OTHER PUBLICATIONS

Balasubramanian et al., "Physical Human Interactive Guidance: Identifying Grasping Principles From Human-Planned Grasps", IEEE Transactions of Robotics, vol. 28, No. 4, Aug. 2012, pp. 899-910.
Yun Lin, "Task-based Robotic Grasp Planning", Jan. 1, 2014, 131 pages.
Jaeyong Sung et al., "Robot Learning Lab", Copyright Cornell University, 2009, 2 pages.

* cited by examiner

*Primary Examiner* — James S. McClellan
(74) *Attorney, Agent, or Firm* — Robert J. Shatto; Hunter E. Webb; Keohane & D'Alessandro, PLLC

(57) ABSTRACT

Aspects of the present invention provide an approach for cognitive computer assistance in student learning of an educational topic. In an embodiment, a student is provided a presentation of educational materials and monitored with at least one sensor while studying. A cognitive computer system determines level of student understanding of the topic and alters said presentation of educational materials based on said determining of said level of student understanding to cognitively assist in said student's learning.

17 Claims, 5 Drawing Sheets

COGNITIVE ROBOTIC ASSISTANCE FOR EDUCATION

TECHNICAL FIELD

The subject matter of this invention relates generally to machine-assisted learning. More specifically, aspects of the present invention provide a solution that uses a cognitive system to monitor student understanding of a presentation of educational materials and modify the presentation to assist in the student's learning.

BACKGROUND

In the educational arts, it is understood that each individual student learns differently from others. Each person is different, requires different learning techniques, and may be better at certain subjects than others. As a result, study topics are often presented to learners in a way that are not optimal for grasping, understanding, and absorbing the topic.

The educational arts need new ways to provide learners with curricula that correspond to an individual's learning styles. A method, device, or program that assists in tailoring educational presentations to particular learning styles would be a significant improvement in the art.

SUMMARY

In general, aspects of the present invention provide an approach for cognitive computer assistance in student learning of an educational topic. In an embodiment, a student is provided a presentation of educational materials and monitored with at least one sensor while studying. A cognitive computer system determines the level of student understanding of the topic and alters the presentation of educational materials based on the determining of the level of student understanding to cognitively assist in the student's learning.

One aspect of the invention provides a computer-implemented method for cognitive assistance in student learning, comprising: providing a student with a presentation of educational materials on a given topic for study by the student; monitoring said student with at least one sensor while the student studies said presentation of educational materials by collecting data from said at least one sensor; obtaining, using a cognitive computer system, a set of conditions in said data from said at least one sensor, each of the set of conditions corresponding to at least one level of student understanding of the topic of said presentation of educational materials; determining, using the cognitive computer system, whether said presentation of educational materials satisfies the set of conditions corresponding to said at least one level of student understanding of the topic; and altering said provided presentation of educational materials based on said determining of said level of student understanding to cognitively assist in said student's learning.

Another aspect of the invention provides a cognitive robotic device for providing assistance in a student's learning, comprising: a memory medium comprising instructions; a bus coupled to the memory medium; and a processor coupled to the bus that when executing the instructions causes the system to perform a method, comprising: providing a student with a presentation of educational materials on a given topic for study by the student; monitoring said student with at least one sensor while the student studies said presentation of educational materials by collecting data from said at least one sensor; obtaining, using cognitive analysis, a set of conditions in said data from said at least one sensor, each of the set of conditions corresponding to at least one level of student understanding of the topic of said presentation of educational materials; determining, using cognitive analysis, whether presentation of educational materials satisfies the set of conditions corresponding to said at least one level of student understanding of the topic; and altering said provided presentation of educational materials based on said determining of said level of student understanding to cognitively assist in said student's learning.

Yet another aspect of the invention provides a computer program product embodied in a computer readable medium that, when executed by a computer device, performs a method for providing assistance in a student's learning, the method comprising: providing a student with a presentation of educational materials on a given topic for study by the student; monitoring said student with at least one sensor while the student studies said presentation of educational materials by collecting data from said at least one sensor; obtaining, using cognitive analysis, a set of conditions in said data from said at least one sensor, each of the set of conditions corresponding to at least one level of student understanding of the topic of said presentation of educational materials; determining, using cognitive analysis, whether presentation of educational materials satisfies the set of conditions corresponding to said at least one level of student understanding of the topic; and altering said provided presentation of educational materials based on said determining of said level of student understanding to cognitively assist in said student's learning.

Still yet, any of the components of the present invention could be deployed, managed, serviced, etc., by a service provider who offers to implement cognitive educational assistance in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

Figure 1:
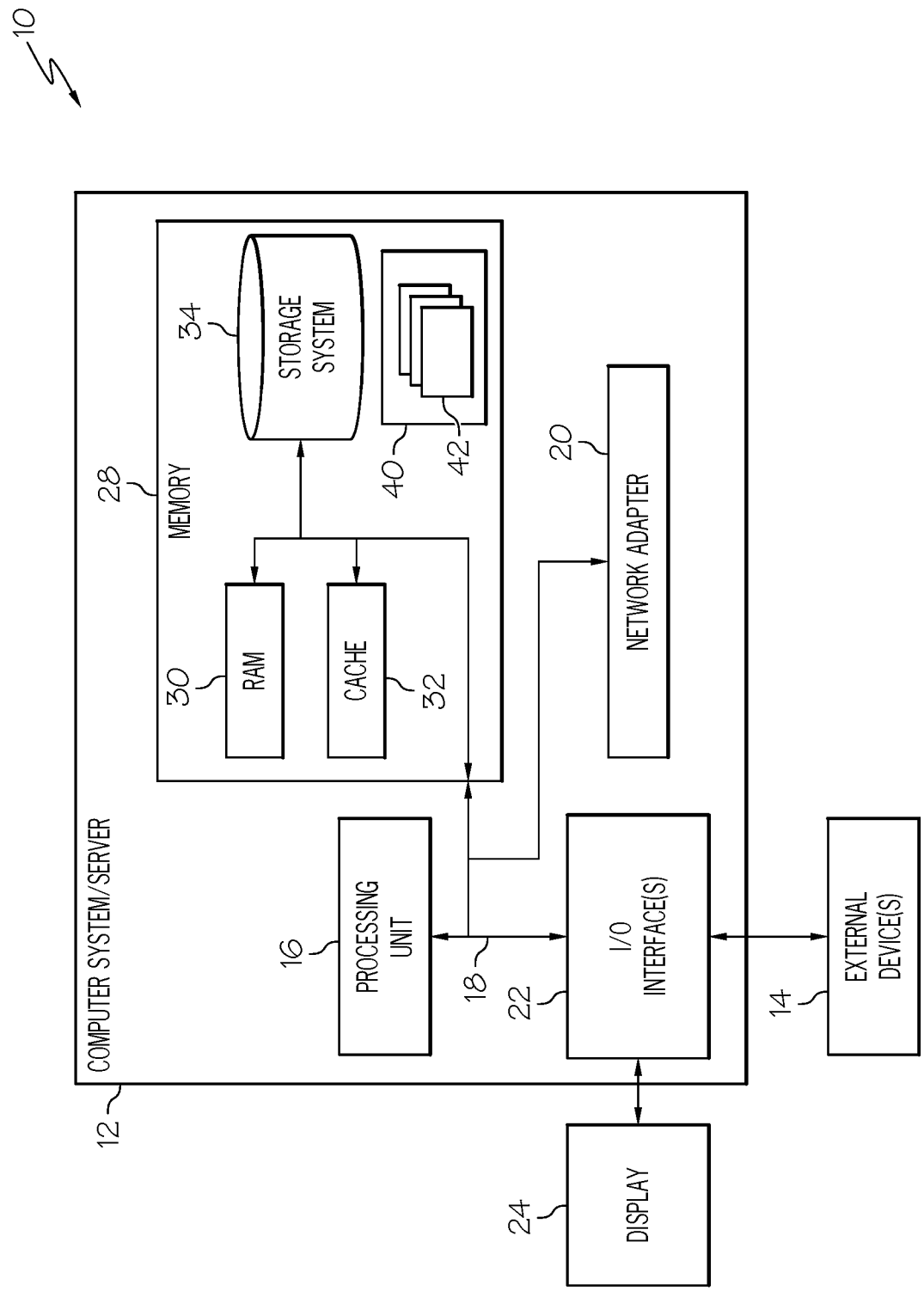
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein.

Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The term "student" encompasses any learner including any individual person, animal, or other subject capable of learning when presented with information. The term is not limited to a student in a traditional learning and/or classroom environment.

As indicated above, aspects of the present invention provide an approach for controlling an operation of a cognitive robotic education assistance device. In an embodiment, a set of conditions is obtained using a cognitive computer system. Each of the obtained conditions includes a measurable physical manifestation of understanding or lack of understanding of a topic by a student studying the topic and possible alternative learning plan components that can be chosen for presentation to the student for further studying. The cognitive computer system analyzes video, audio, and/or other biometric data being captured by one or more video capture devices, one or more audio capture devices, and/or one or more biometric capture devices to determine whether the data satisfy any of the set of conditions (e.g., the student is understanding or not understanding the topic at a desired level of understanding). If the cognitive computer system determines that one of the set of conditions has been satisfied, the system cognitively chooses a different learning plan component for further study or cognitively chooses to continue with the existing learning plan component for further study.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on, that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in data processing system 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program code embodied on a computer readable medium can be transmitted using any appropriate medium including, but not limited to, wireless, wireline, optical fiber cable, radio-frequency (RF), etc., or any suitable combination of the foregoing.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
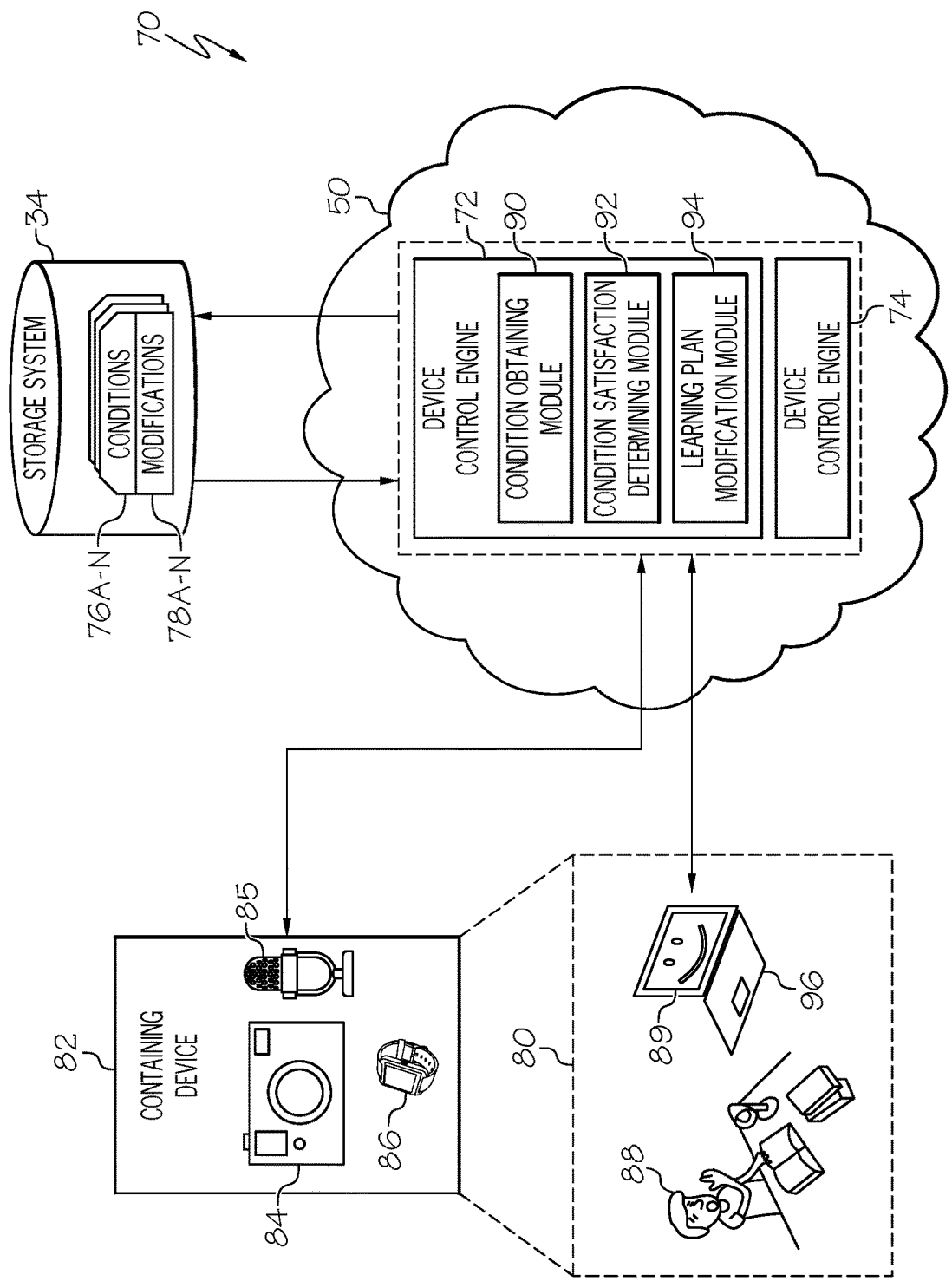
FIG. 2 depicts a system diagram according to an embodiment of the present invention.

Referring now to FIG. 2, a system diagram describing the functionality discussed herein according to an embodiment of the present invention is shown. It is understood that the teachings recited herein can be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each sensor device such as image capture device 84, audio capture device 85, and/or biometric capture device 86 (sensor devices 84, 85, and/or 86), or containing device 82 within which sensor devices 84, 85, and/or 86 are included, or instructional device 96 need not have a device control engine (hereinafter "system 72"). Rather, system 72 could be loaded on a server or server-capable device that communicates (e.g., wirelessly) with sensor devices 84, 85, and/or 86 and/or instructional device 96 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 can be incorporated within or work in conjunction with any type of system that receives, processes, and/or executes commands with respect to sensor devices 84, 85, and/or 86 and instructional device 96 (e.g., in a cognitive and/or network computing environment). Such other system(s) have not been shown in FIG. 2 for brevity purposes.

Along these lines, system 72 can perform multiple functions similar to a general-purpose computer. Specifically, among other functions, system 72 can control an operation of sensor devices 84, 85, and/or 86 and can control educational presentations of learning plan component 89 on instructional device 96. To accomplish this, system 72 can include: a condition obtaining module 90, a condition satisfaction determining module 92, and a learning plan modification module 94.

Referring again to FIG. 2, sensor devices 84, 85, and/or 86 are shown capturing data component 80 according to an embodiment of the invention. Data component 80 can be a sequence of captured image, sound, biometric and/or other data (e.g., with each taken a predetermined amount of time after the previous data capture) or, alternatively, data component 80 can be a stream of data. To this extent, image capture device 84 can be a video device (e.g., a camera, a video camera, an infrared (IR) camera, a broad wavelength electromagnetic detector (such as an IR and visible wavelength detector or an IR, visible, and ultraviolet (UV) detector), or any other device capable of capturing electromagnetic analog images, digital images, and/or the like), audio capture device 85 can be an audio device (e.g., a microphone, a sound wave detector, or any other device capable of capturing analog sound (motion) waves, digital sound, and/or the like), and biometric capture device 86 can be any biometric device (e.g., an electrocardiographic monitor (EKG), a heart rate monitor, an oxygen level monitor, a blood pressure monitor, an electroencephalographic (EEG) monitor, a body temperature monitor, or any other device capable of capturing analog biometric data, digital biometric data, and/or the like). In some embodiments, biometric capture device 86 can be included in a wearable device such as a smart watch or other wearable biometric tracker.

Further, in some embodiments, sensor devices 84, 85, and/or 86 can be encompassed within containing device 82 while in others, sensor devices 84, 85, and/or 86 can be stand-alone devices. In an alternative, containing device 82 can likewise contain instructional device 96. In embodiments in which sensor devices 84, 85, and/or 86 and instructional device 96 are encompassed within containing device 82, containing device 82 can include, but is not limited to, a cognitive robotic (CR) device, such as a robot or robotic device, including, for example, a self-moving robot or a stationary robot, a drone, a video game system, a computer system, a smart device, an internet of things device, and/or the like. In some embodiments, sensors can be added to an existing platform. A robotic device such as Microsoft Kinect or Sony Aibo can be employed. (Microsoft and Kinect are trademarks of Microsoft Corporation. Sony and Aibo are trademarks of Sony Corporation.) In any case, while performing its function, sensor devices 84, 85, and/or 86 can capture a sensor data component 80 that contains video, audio, and/or other biometric data on a student 88 and any learning plan component 89 that is currently being presented to and/or studied by individual student 88 whether or not said learning component 89 is on an instructional device 96. For example, learning plan component 89 can be a book or other physical educational medium presented to student 88 via a robotic action by instructional device 96 or presented to student 88 by a teacher or other person.

The inventors of the invention described herein have discovered certain deficiencies in the current solutions in assistance in student learning of an educational topic. For example, in many cases in pedagogical environments, study topics are presented to a student without regard to the student's inherent learning style. The student may be able to understand and absorb the topic or may not be able to understand and absorb the topic. Each person (student) learns differently, requires different learning techniques, and may be better at certain subjects than others. It is often difficult and/or impossible to determine if the student has absorbed the material while the teaching is ongoing. A method and system that can determine struggles in a student learning certain topics and make real-time education material and delivery adjustments to improve the chances of learning success for the person is provided herein.

It is recognized that extensive variability exists among populations in measurable physical manifestations of mental status. This extensive variability has, until now, meant that physical manifestations of mental status have not been conceived in the art as helpful in any machine-assisted education. Aspects of the invention disclosed herein overcome this lack of conception and provide cognitive processing to observe specific cues (physical manifestations) from an individual student 88 that can be employed as conditions 76A-N for modifications 78A-N of a learning plan through learning plan modification module 94.

As an example, modifications 78A-N can be cognitively drawn from a database of a plurality of learning plans from which a presentation of educational materials is provided, wherein at least some of the plurality of learning plans have a plurality of learning components that are interchangeable among at least some of the plurality of learning plans. These learning components within a learning plan can be indexed within a database of possible modifications 78A-N. In one example, cognitive system 74 can draw from a database containing only full, non-indexed, presentations on a topic such as algebra and a first full presentation can be provided to student 88. If cognitive system 74 detects that student 88 is not learning the material in the middle of the first full presentation of algebra, cognitive system 74 can choose among modifications 78A-N and provide a different, second full presentation on the topic of algebra. In this example, some of the material would be repeated because the first and second full presentations on algebra are not indexed and, therefore, do not contain a plurality of learning components available to cognitive system 74 within the learning plans of the full presentations.

In comparison, in another example, presentations of algebra can be indexed in a database. When cognitive system 74 detects that student 88 is not learning the material from a first presentation of algebra, cognitive system 74 can choose among modifications 78A-N to provide learning plan components from a new presentation that do not repeat the topics already presented.

Referring again to FIG. 2, condition obtaining module 90 of system 72, as executed by computer system/server 12, is configured to obtain a set of conditions 76A-N that may necessitate altering a learning plan to alter a presentation of educational materials based on a determining of a level of student understanding to cognitively assist in said student's learning.

In an embodiment, these conditions 76A-N can be provided to cognitive system 74 initially by individual student 88 (herein "student 88"), by another user of the sensor devices 84, 85, and/or 86, by someone who has oversight of the learning plan for student 88, or by any other appropriate user. Student 88 or another individual can configure cognitive system 74 to analyze certain emotive sounds in a particular way such as "ah" as a positive sound correlated with understanding or the phrase "don't get it" or the sound "uh?" as negative sounds correlated with a lack of understanding. Likewise cognitive system 74 can "learn" over time through input from data component 80 that particular emotive sounds from student 88 correlate with understanding or lack of understanding of an educational topic. Student 88 or other individual can additionally configure cognitive system 74 to analyze certain physical actions in a certain way such as crossing one's arms, scratching one's head, or scratching one's leg as a negative physical action correlated with understanding or lack of understanding. Other visual patterns can include any pattern ascertainable through visual, audio, and/or other biometric data and can include, for example, student 88 looking down, wiping head, scratching leg, looking up, standing up, pacing, smiling, frowning, etc. Again, cognitive system 74 can "learn" over time through input from data component 80 that particular physical actions of student 88 correlate with a level of understanding (whether understanding, lack of understanding, or somewhere in between).

While student 88 studies a topic, biometric, visual, audio and other clues sensed by cognitive system 74 (within system 12, including for example, a cognitive robotic system (CR)) that are determined to be indicative of a level of attention and a level of student 88 grasping a topic or "getting it" can be retained by cognitive system 74 for use in future learning sessions for student 88. Over time, the system becomes more accurate on what works for student 88 as well as other students 88 that can share learning characteristics with any other student 88 on which the system has gathered and analyzed data.

Subsequently, conditions 76A-N can be retrieved by an interaction between sensor devices 84, 85, and/or 86 and/or containing device 82 with a cognitive system 74 (e.g., in response to an event such as a startup of any of sensor devices 84, 85, and/or 86, or containing device 82, a change of an individual student 88 or learning plan component 89 within data component 80, or the like). To this extent, cognitive system 74 is a computer system that is configured to provide information and/or determine learning plans based on provided information and external contextual data. Cognitive system 74 has self-learning attributes that increase the accuracy of the determinations as more information and/or contextual data is provided. In an embodiment, cognitive system 74 can include IBM's Watson Analytics or Watson Personality Insights (Watson and IBM are trademarks of International Business Machines Corporation). In any case, each condition 76N in the set of conditions 76A-N can reflect one or more individual students 88 that can be captured in data component 80 and one or more learning plan components 89 that the student 88 is studying. Employing containing device 82 with sensor devices 84, 85, and/or 86, system 12 is able to monitor student 88 while student 88 studies learning plan component 89 and through condition obtaining module 90 and condition satisfaction determining module 92 interpret cues as to whether student 88 is comprehending material provided in learning plan component 89. Based on different input factors, cognitive system 74 can modify teaching methods through modification 78A-N by altering learning plan component 89 or by altering the presentation of learning plan component 89 (for example by altering visual presentation to audio presentation or graphical presentation to physical presentation) or can find more suitable material for student 88 in a new learning plan component 89. Cognitive System 74 is self-learning and becomes smarter about each individual student 88 over time as data is collected and analyzed to determine what works and does not work with the learning style of student 88.

Cognitive system 74 can initially begin with a student by employing an aggregate baseline of visual, audio, and biometric signals based on correlations between signals and learning success for an aggregate of students. Cognitive system 74 can narrow expected correlated signals based on information provided for the particular student such as age, gender, region, cultural background, height, weight, level of education, personal preferences, primary language, secondary language, etc.

Cognitive system 74 can likewise identify more than one individual student to assist in education. Using facial recognition or other identifying data, cognitive system 74 can assist an entire classroom or subgroup (breakout session) of a classroom of students by creating a set of conditions 76A-N for each student in a classroom and monitoring each student's studying and progress using data component 80 to track individual students 88 and alternative learning plan components 89 for each individual student 88 to provide a somewhat different presentation of educational materials based on a determining of a level of student understanding from condition satisfaction determining module 92 and learning plan modification module 94.

In a classroom setting, cognitive system 74 can also identify and create groups of students from within the classroom having similar learning styles. Different learning plan components 89 can then be presented to the various groups selected by learning style. Likewise in a classroom setting, cognitive system 74 can provide a teacher (through, for instance, instructional device 96) suggested changes in presentation style or substance of a learning plan component 89 for one or more individual students 88 in the classroom.

Figure 3:
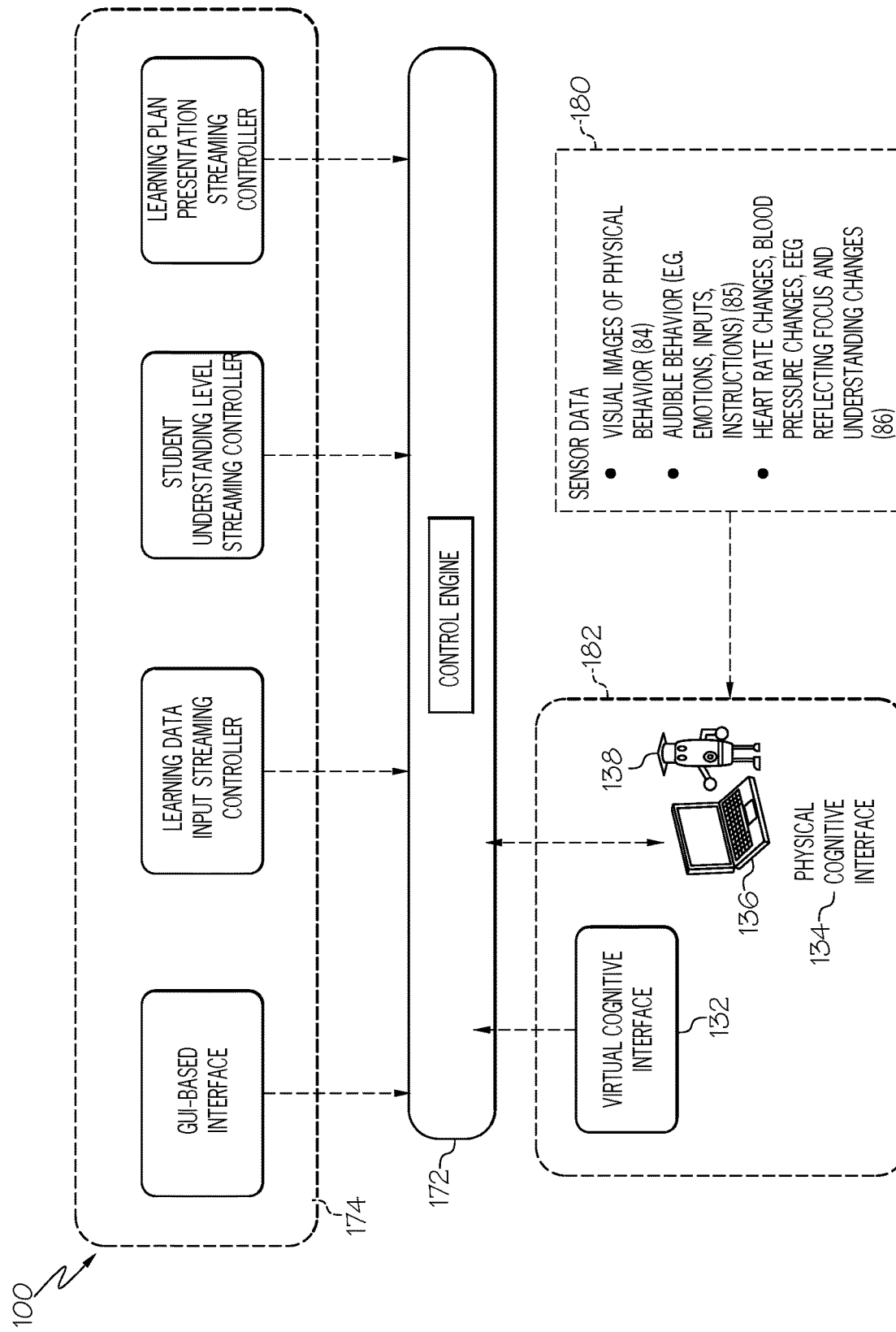
FIG. 3 depicts an example component diagram according to an embodiment of the present invention.

Referring now to FIG. 3 with reference to FIG. 2, an example component diagram 100 is depicted according to an embodiment of the current invention. As shown, component diagram 100 includes a control engine 172, a cognitive system 174, and a containing device 182 that includes a virtual cognitive interface 132 and a physical cognitive interface 134. Cognitive system 174 includes a graphical user interface (GUI)-based interface 112, a learning data input streaming controller 114, a student understanding level streaming controller 116, and a learning plan presentation streaming controller 118.

Physical cognitive interface 134 includes one or more sensor devices such as image capture device 84, audio capture device 85, and/or biometric capture device 86, as well as capacity to provide visual text, instructions, and learning materials that are part of learning plan component 89 through interactive screen 136 and verbal instructions and physical learning materials that are part of learning plan component 89 through robotic instructor device 138. As illustrated, cognitive system 174 includes a GUI-based interface 112. Within FIG. 3 referencing FIG. 2, all components of both figures can be incorporated in a single device to create, for example, a cognitive robotic device for assistance in education. A cognitive robotic device can contain all devices of FIG. 2 and FIG. 3 in one device and can query a network for program instructions such as, for example, from a device control engine 72 with curricular information available from a network connection through network adapter 20 or from a storage system 34.

Referring again to FIG. 2 and FIG. 3, GUI-based interface 112 can be used to provide information regarding any individual student 88 included in a particular condition 76N. For example, a user can use GUI-based interface 112 to provide a database on student 88 including information regarding any data associated with student 88 in a particular condition 76N correlated with understanding, lack of understanding, focus, lack of focus, or other mental state. The database can contain data on visual images of physical behavior correlated with understanding, lack of understanding, focus, lack of focus, or other mental state. The database can contain data on audible behavior such as emotions correlated with understanding, lack of understanding, focus, lack of focus, or direct verbal instructions or other direct information from student 88 to cognitive system 174. The database likewise can contain data on biometric information correlated with understanding, lack of understanding, focus, lack of focus or other mental state. The database can also include statistical information on a topical level with information about how well student 88 progresses or has affinity with a topic or with a style of learning. It also can include statistics concerning learning methods, so cognitive system 74 can determine a best fit for which, among available learning methods, best assists student 88 in learning a given topic. For example, student 88 can grasp topics 85% of the time with one instructional method and can grasp topics only 45% with another instructional method.

In an embodiment, a user can utilize GUI-based interface 112 to upload a video image, audio sound track, or biometric data of individual student 88 reflecting particular conditions 76A-N correlated with understanding, lack of understanding, focus, lack of focus, or other mental state. Alternatively, particular conditions 76A-76N could be provided via GUI-based interface 112 without correlated data for student 88 but with correlated data for an aggregate of students. Cognitive system 174 can search other sources for video, audio, and biometric data and/or other information and use this to assemble characteristics that can be used to determine whether a condition 76A-76N is correlated with lack of understanding. The information associated with condition 76A-76N can then be provided by cognitive system 174 to control engine 172 using student understanding level streaming controller 116. Cognitive system 174 through learning plan presentation controller 118 can then provide control engine 172 with instructions for altering learning plan component 89 as presented on interactive screen 136 or through robotic instructor device 138.

In an embodiment of an initial run of cognitive robotic assistance with the studies of student 88 and before cognitive system 74 is provided with observations of student 88, cognitive system 74 can query a knowledgebase of other students 88 to provide a faster prediction of the aptitude and learning styles of student 88 based on partial data. Cognitive system 74 can compare student 88 with other students 88 having similar profiles. Cognitive system 74 can test various techniques to gauge results in learning progress for student 88. For example, variable learning environments can include playing music, setting goals, giving progress updates, recommending breaks, recommending exercise, giving rewards via an integrated reward system, etc. Cognitive system 74 can begin with a baseline of aggregate data and move to more specific data as more data on student 88 is gathered.

Cognitive system 74 can learn to react to visual, audial, and biometric clues and can search a collection of information for different material on the same subject in one of modifications 78A-N when certain clues trigger one of conditions 76A-N. Sometimes the system will determine that the basics of a given topic need to be relearned and, for example, can present less advanced material on the given topic.

Cognitive system 74 can receive other inputs such as social media inputs, calendar inputs, or analysis of email or texts of student 88 to determine if student 88 may be over-tired, stressed, angry, happy, serene, etc. Cognitive system 74 can adjust in its pace of presentation of learning plan component(s) 89 or can recommend study schedule adjustments for student 88. In some embodiments, a fixed deadline can exist from an external authority or, alternatively, can be created by cognitive system 74 to encourage student diligence and cognitive system 74 can alter learning plan components 89 to assist in achieving such fixed deadlines.

Cognitive system 74 can employ conditions 76A-N to detect moods of student 88. Cognitive system 74 can receive communication integration to learn mood and/or energy or ability changes in student 88. For example, if text analysis of the social interactions of student 88 in text messages shows student 88 is in an emotional state that is not conducive to learning, observations collected if the student is engaged in a learning activity can be disregarded or flagged by cognitive system 74 as observations under an inconducive emotional state, which can then be used, for example, to tailor learning when the student is in a similar state in the future.

Referring again to FIG. 2 in conjunction with FIG. 3, condition satisfaction determining module 92 of system 72, as executed by computer system/server 12, is configured to use cognitive system 74 to determine whether data that is currently being captured by sensor devices 84, 85, and/or 86 satisfy set of conditions 76A-N demonstrating understanding, lack of understanding, focus, lack of focus or other mental state. In an embodiment, the making of this determination could be triggered by an identification through learning data input controller 114 of a change in level of understanding as analyzed by student understanding level streaming controller 116 from data input from data component 80, which can prompt learning plan presentation streaming controller 118 to provide an altered learning plan component 89 at interactive screen 136 and/or robotic instructor device 138. In any case, to accomplish this, a virtual cognitive interface 132 in containing device 182 can provide data 180 from sensors 84, 85, and/or 86 to control engine 172. Sensor data 180 can be a raw video, audio, and/or biometric data component 80 captured by sensor devices 84, 85, and/or 86. Alternatively, virtual cognitive interface 132 can process the data component 80 to generate processed sensor data 180 that identifies understanding, lack of understanding, focus, lack of focus or other mental state of student 88 and this processed sensor data 180 can be forwarded to control engine 172 in conjunction with metadata, for instance, or in place of raw data from data component 80. In any case, control engine 172 can analyze this processed sensor data 180 in light of the information provided to learning data input streaming controller 114 and student understanding level streaming controller 116 to make its determination of student understanding and prompt learning plan presentation streaming controller 118 to alter the learning plan component at physical cognitive interface 134.

Capture device modification module 94 of system 72, as executed on computer system/server 12, is configured to modify the learning plan as presented at the learning plan component 89 in response to a determination by condition satisfaction determining module 94 that the data currently being captured by data component 80 satisfies set of conditions 76A-N. In an embodiment, each of set of conditions 76A-N can be associated with a modification 78A-N. In an embodiment, control engine 172 can send an instruction to containing device 182 to perform to specific modification 78N associated with the detected condition via a physical cognitive interface 134. Then, containing device 182 can execute the instruction to modify the learning plan component 89 being presented at physical cognitive interface 134 to student 88. To this extent, the operation of learning plan modification module 94 can provide a number of different modifications 78A-N to the learning plan component depending on satisfied conditions 76A-N. These modifications 78A-N can include modifications for learning styles and/or student aptitude such as, for example, visual learning, audial learning, experiential learning and instructional learning, modifications for preference in medium such as video media, physical media (models, text books, lab experiments), audio media (music, poetry, rhythm, tone of voice, breathing rate), incorporation of many types of media in one setting, or any other modification 78A-N that may be desired. It is understood that conditions 76A-N and modifications 78A-N reflect a virtually unlimited number of possible conditions and modifications limited solely by the processing power of system 12.

To this extent, system 72 is able to make decisions using cognitive system 174 that it would previously have been impossible to make and to perform actions based on these decisions. Similarly to the functionality of a self-driving car, this decision-making and action-performing ability based on real-world situations would have previously required a human being as an educational instructor to be present and alert on a full-time basis. Further, this decision-making and action-performing ability is available in current computing environments at a level of processing that significantly outstrips the observational and analytical abilities of any human educational instructor. Thus, the teachings of the present invention improve the educational environment of student 88 by providing human-like decision-making (with data processing power well exceeding human processing capacity) concerning learning plan modification without the need for actual human intervention and with improved decision-making capacity for individual students to provide individualized learning plans. The teachings of the present invention likewise can improve the educational environment of student 88 by providing data-driven suggestions to any teacher overseeing the education of student 88.

A curriculum for a given topic made up of multiple learning plans with multiple learning plan components on the topic can be loaded into computer system 12 with alternative learning plans loaded into the learning plan modification module 94 having different learning plan components designed to be most beneficial for students with different learning styles and/or aptitudes. Different learning styles may include a visual learner, an audial learner, an experiential learner, an instructional learner, etc., or learning styles may be impacted by specific learning disabilities such as dyslexia, attention deficit hyperactivity disorder (ADHD), auditory processing disorder, dyscalculia, dysgraphia, language processing disorder, non-verbal learning disabilities, visual perceptual/visual motor deficit, or other learning disabilities.

Student 88 can be provided educational materials based on the most prevalent learning style in the student's gender, age, region, cultural background, national background, educational level, first language, second language, and other identifying characteristics. In an alternative, the student can enter into the system the student's understanding of the student's preferred learning style or can complete a personality assessment on the system to suggest a possible learning style. The system can then provide learning plan components for the student's studies. As the student progresses through various learning plan components, the system monitors the student's response to learning including, for example, visual monitoring, audio monitoring, heart rate monitoring, blood pressure monitoring, oxygen level monitoring, electroencephalographic monitoring, body temperature monitoring and/or other kinds of monitoring of data correlated with learning. The system can query the student as the student progresses through the various learning plan components to provide quantitative testing of the learning progress of student 88. Additionally and/or alternatively, the student can directly instruct the system as the student progresses through the various learning plan components as to whether the student is understanding the material or not understanding the material or is highly focused on the material or rather disinterested in the material.

The system can compare the student's response to various queries (and/or compare the student's direct instructions to the system) to the visual, audiological, and biometric data gathered during the study session. The system can analyze the data to determine a specific learning style for the student, a particular area of interest of the student, a particular aptitude of the student, and/or a particular presentation style that is most helpful for the student. The system can then select learning plan components best suited for the progress of the student.

For example, cognitive system 74 can learn that student 88 progresses best when material is presented more than once in a serial or non-serial manner. Cognitive system 74 can likewise provide alternate representations of certain media to determine what media style provides the best learning environment for student 88. Cognitive system 74 can, for example, instruct student 88 through instructional device 96 to read text, then speak text, then write text in order to trigger several different neural networks of student 88. Cognitive system 74, as an additional example, may provide a laboratory experiment for student 88 to undertake following a particular learning session.

Cognitive system 74 can present digital and/or physical learning plan components to student 88 via physical cognitive interface 134 through, for example, presentation of text, graphical representations, or videos (or combinations thereof) on interactive screen 136 or presentation of actual text books or physical learning materials through robotic instructor device 138 or verbal instructions from robotic instructor device 138.

A student may have an online profile that is queried through network adapter 20 or storage system 34 which could store a student profile where no network connection is necessary. Alternatively some information on a student may be available through a network, while other information on a student may be available through storage within a device not requiring a network connection. This combination can improve efficiency. The devices provided herein can be stationary or mobile, network connected or self-contained as necessary for the particular educational environment in which the device is employed.

For example, assume a student is learning the computer language Java at home. (Java is a trademark of Oracle of America, Inc.). A Java language curriculum can be loaded into computer system 12 with alternative learning plans having different learning plan components designed to be most beneficial for students with different learning styles and/or aptitudes stored as modifications 78A-N and processed through learning plan modification module 94. Modifications 78A-N can be cognitively determined by cognitive system 74 and can be provided for different learning styles including, for example, visual learning, audial learning, experiential learning, instructional learning, etc. Condition 76N can specify correct answers when material is provided verbally from robotic instructional device 138. If condition 76N is met, modification 78N can be that instructions are given both in text in the Java system and verbally through robotic instructional device 138. Condition 76C can specify correct answers when material is serially provided five times. If condition 76C is met, modification 78C can be that instructions are given serially five or more times.

As another example, a student may instruct cognitive system 74 through the GUI-based interface such as interactive screen 136 that the student wishes to study medieval history of the Sahel. Computer system 12 can query the Internet through network adapter 20 to download curricula on medieval history of the Sahel from various providers of educational curricula. Cognitive system 74 can then choose an initial video without musical accompaniment as a learning plan component 89 from one of the various available educational curricula. Learning plan presentation streaming controller 118 can then provide the video to interactive screen 136 for viewing by student 88. If data component 80 satisfies condition 76B that student 88 is demonstrating lack of interest, then modification 78B can be that cognitive system 74 chooses a video with musical accompaniment from a different curriculum through learning plan modification module 94 for presentation on interactive screen 136. If data component 80 satisfies condition 76D that student 88 is demonstrating understanding of the material (through visual capture device 84, audio capture device 85, or biometric capture device 86 and/or through queries of the student concerning the material at interactive screen 136), modification 78D can be that cognitive system 74 then chooses a second video with musical accompaniment from the same curriculum through learning plan modification module 94 for presentation as a further learning plan component of medieval history of the Sahel on interactive screen 136. Cognitive system 74 can additionally choose to provide student 88 with a physical replica of a salt block that may have been transported through the Sahel in medieval times using robotic instructional device 138 to retrieve the replica from a physical storage area or to output the replica from a 3D printer. If the physical replica triggers an increase in heart rate via biometric capture device 86 condition 76B that student is demonstrating interest in the topic through experiential learning can be satisfied and modification 78B can be that cognitive system 74 chooses other physical replicas for presentation to student 88.

As another example, a classroom teacher instructs cognitive system 74 through the GUI-based interface such as interactive screen 136 to provide instruction on the geometry of parallelograms. The classroom teacher may load a curriculum onto computer system 12 having a variety of learning plan components based on learning styles. The classroom teacher may download pictures of each of 20 students onto computer system 12 and provide each student with a smart watch having an audio capture device 85 and various biometric capture devices 86. Cognitive system 74 can identify each student using facial recognition. Cognitive system 74 can then choose three videos from the curriculum. The first video may provide the information graphically. The second video may provide the information verbally. The third video may provide the information with photos. Students demonstrating more understanding of the topic from the first video may satisfy one of conditions 76A-N for graphical learning of geometric concepts and the corresponding modification 78A-N would be to place those students in a group that is provided more graphical information. Students demonstrating more understanding of the topic from the second video may satisfy one of conditions 76A-N for verbal learning of geometric concepts and the corresponding modification 78A-N would be to place these students in a group that is provided more verbal information. Students demonstrating more understanding of the topic from the third video may satisfy one of conditions 76A-N for photo image learning of geometric concepts and the corresponding modification 78A-N would be to place these students in a group that is provided more photo image information. If a particular student is not grasping the material at all, cognitive system 74 can notify the teacher that the particular student may benefit from individual tutoring.

As another example, a student may instruct cognitive system 74 through the GUI-based interface such as interactive screen 136 that the student wishes to study statistics and probability. Computer system 12 can query the Internet through network adapter 20 to download curricula on statistics and probability from various Internet teaching academies. Cognitive system 74 can choose an initial video from a particular Internet teaching academy. Cognitive system 74 can query student 88 as to how student 88 is learning from the provided video. A response that student feels he/she is not learning well can satisfy condition 76M, then modification 78M can be that cognitive system 74 chooses a video from a different internet academy through learning plan modification module 94 for presentation on interactive screen 136.

Figure 4:
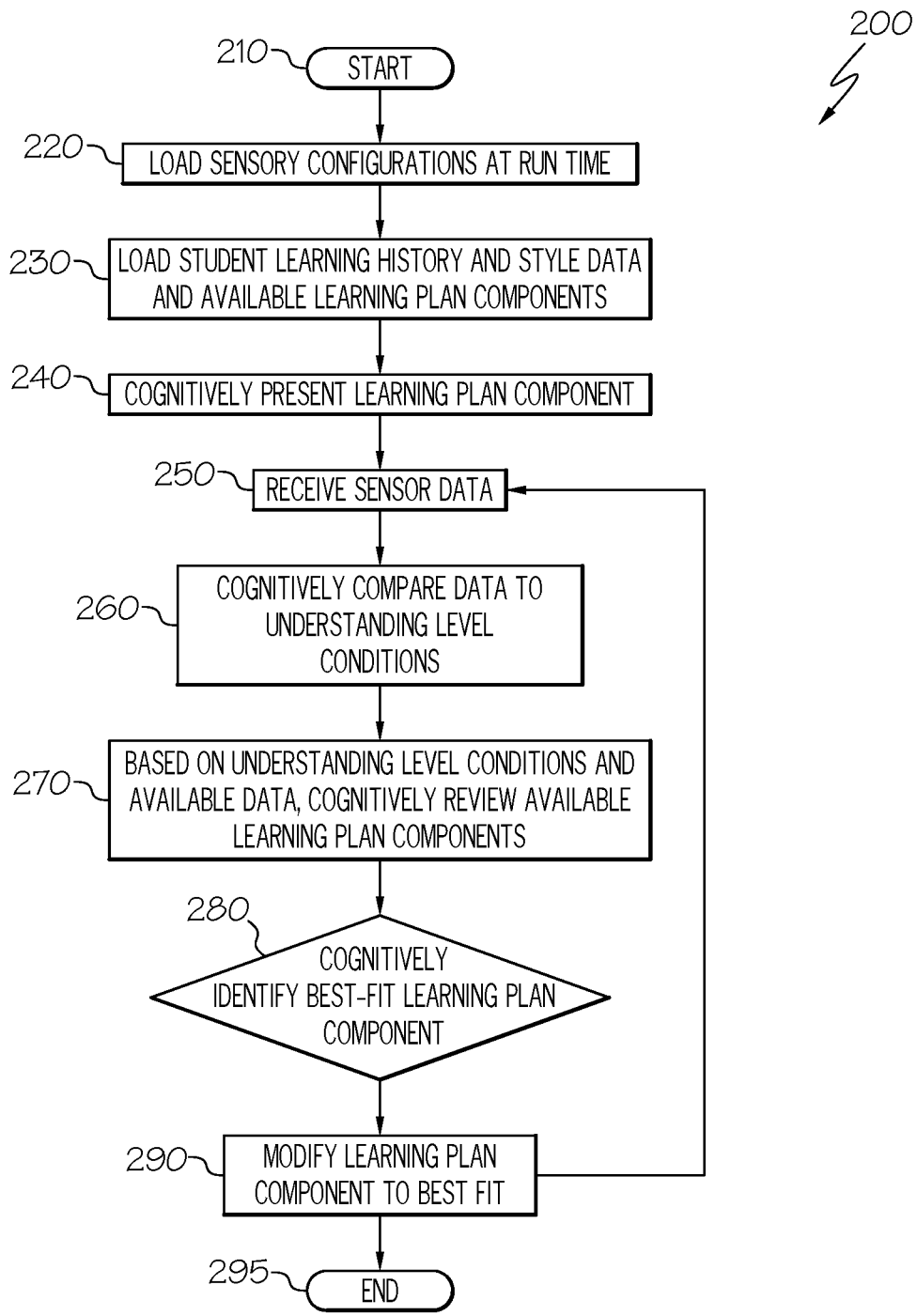
FIG. 4 depicts an example process flowchart according to an embodiment of the present invention.

Referring now to FIG. 4, a process flowchart 200 according to an embodiment of the present invention is shown. Flow begins at 210. At 220, sensory configurations are loaded (e.g., at run time). At 230, student learning history and learning style data as well as available learning plan components are loaded. At 240, based on initial learning history, learning style, and available learning plan components, a learning plan component is cognitively chosen and presented. At 250, sensor data is received as learning plan component is studied. At 260, sensor data and student learning history and style data are cognitively analyzed to determine understanding level conditions. At 270, available learning plan components are cognitively analyzed based on understanding level conditions, available data, and available learning plan components. At 280, a best-fit learning plan component is cognitively identified. At 290, the learning plan component is modified to best fit. From 290, the process flow returns to 250 for further receipt and processing of sensor data. Upon instructions or ending of study session, the process ends at 295.

Figure 5:
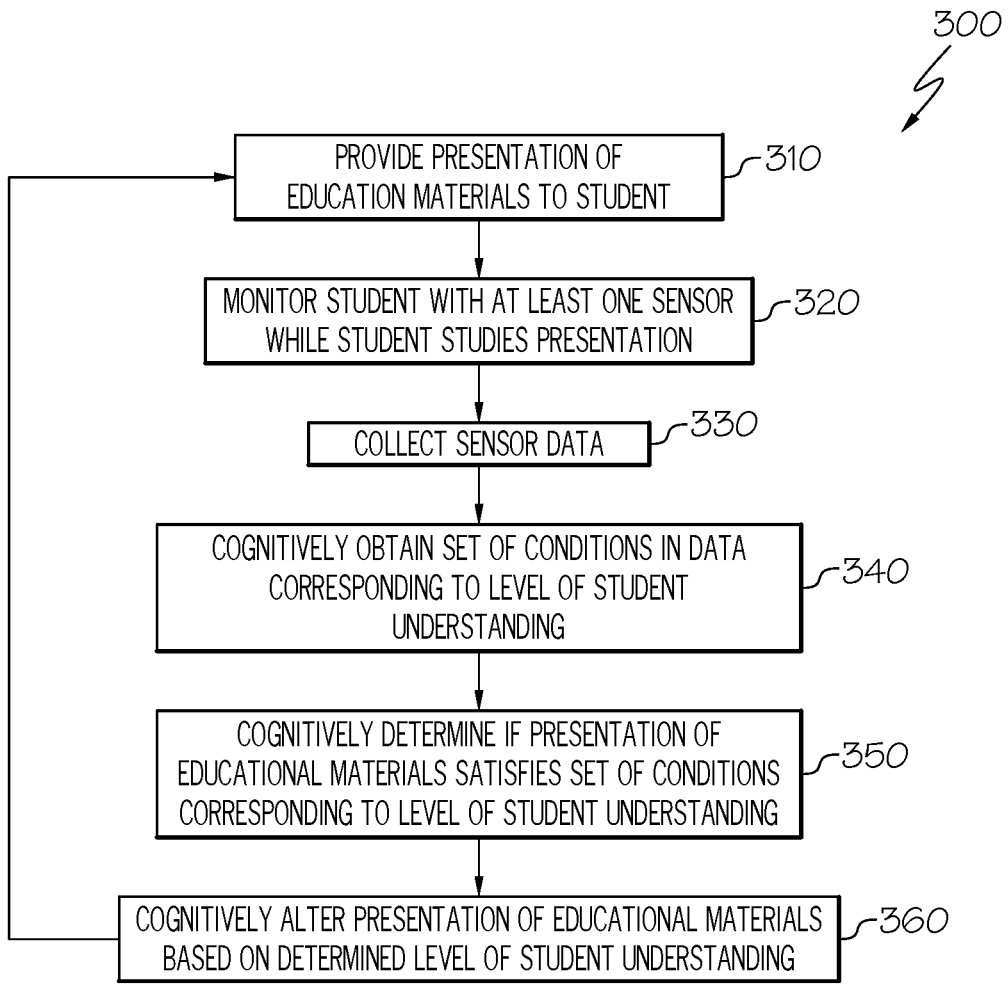
FIG. 5 depicts an example process flowchart according to an embodiment of the present invention.

Referring now to FIG. 5 in conjunction with FIG. 2, a process flowchart 300 according to an embodiment of the present invention is shown. At 310, learning plan modification module 92 provides an initial learning plan component 89 as presentation of education materials to student 88 on learning device 96. At 320, sensor devices 84, 85, and/or 86 monitor student 88 and provide sensor data 80 to system 12. At 330, sensor data is collected at condition obtaining module 90. At 340, condition obtaining module 90 of system 72, as executed by computer system/server 12, uses cognitive system 74 to obtain a set of conditions 76A-N in data corresponding to student 88 and a change in level of understanding of the student as analyzed by student understanding level controller 116, while student 88 is studying learning plan component 89. At 350, condition satisfaction determining module 92, as executed by computer system/server 12, uses cognitive system 74 to determine whether student understanding level satisfies set of conditions 76A-N corresponding to desired level of student understanding. At 360, learning plan modification module 94, as executed by computer system/server 12, modifies learning plan component 89 in response to a determination that the data component 80 from containing device 82 satisfies set of conditions 76A-N.

The process flowcharts of FIG. 4 and FIG. 5 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for controlling an operation of a cognitive robotic system for education assistance, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for controlling an operation of a cognitive robotic system for education assistance. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for controlling an operation of a cognitive robotic system for education assistance. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit can be implemented as a hardware circuit comprising custom VLSI circuits or gate arrays, off-the-shelf semiconductors such as logic chips, transistors, or other discrete components. A system or unit can also be implemented in programmable hardware devices such as field programmable gate arrays, programmable array logic, programmable logic devices or the like. A system or unit can also be implemented in software for execution by various types of processors. A system or unit or component of executable code can, for instance, comprise one or more physical or logical blocks of computer instructions, which can, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices and disparate memory devices.

Furthermore, systems/units can also be implemented as a combination of software and one or more hardware devices. For instance, system 72 can be embodied in the combination of a software executable code stored on a memory medium (e.g., memory storage device). In a further example, a system or unit can be the combination of a processor that operates on a set of operational data.

As noted above, some of the embodiments can be embodied in hardware. The hardware can be referenced as a hardware element. In general, a hardware element can refer to any hardware structures arranged to perform certain operations. In one embodiment, for example, the hardware elements can include any analog or digital electrical or electronic elements fabricated on a substrate. The fabrication can be performed using silicon-based integrated circuit (IC) techniques, such as complementary metal oxide semiconductor (CMOS), bipolar, and bipolar CMOS (BiCMOS) techniques, for example. Examples of hardware elements can include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments can be embodied in software. The software can be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention can also be a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for controlling an operation of a cognitive robotic education assistance device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for cognitive assistance in student learning, comprising:
    identifying a student and each other student of a plurality of other students in a classroom using facial recognition;
    providing the student with a presentation of educational materials on a given topic for study by the student;
    monitoring said student with at least one sensor while the student studies said presentation of educational materials by collecting data from said at least one sensor;
    monitoring the other students along with the student with at least one sensor while the student studies said presentation of educational materials to obtain a set of conditions for each of the plurality of other students;
    obtaining, using a cognitive computer system that has self-learning attributes that increase accuracy of determinations as more information and contextual data is provided, a set of conditions in said data from said at least one sensor, each of the set of conditions including a measurable physical manifestation corresponding to at least one level of student understanding of the topic of said presentation of educational materials;
    assigning a learning style of a set of learning styles based on the set of conditions that have been obtained, wherein as least one of the other students is assigned a learning style that is different from a learning style assigned to the student, each of the set of learning styles being selected from a group consisting of: visual learning, audial learning, experiential learning and instructional learning; and
    determining, using the cognitive computer system, whether said presentation of educational materials satisfies the set of conditions corresponding to said at least one level of student understanding of the topic;
    grouping the student with at least one other student that was assigned a common learning style, wherein at least one more other student is grouped into a different group having a different learning style; and
    altering said provided presentation of educational materials by substituting a current learning module tailored to a first learning style with a new learning module tailored to a second learning style based on said determining of said level of student understanding to cognitively assist in said student's learning.

2. The method of claim 1, wherein said cognitive computing system comprises a database having a plurality of learning plans from which said presentation of educational materials are provided, wherein at least some of said plurality of learning plans comprise a plurality of learning components that include a first learning component tailored to the first learning style and a second learning component tailored to the second learning style that are interchangeable among at least some of said learning plans.

3. The method of claim 1, wherein said cognitive computing system comprises a database having a personal history of learning of said student.

4. The method of claim 3, wherein said cognitive computing system relates said data collected from said at least one sensor to said database having personal history of learning of said student to estimate a level of student aptitude and provides an alternative presentation of educational materials based on student aptitude.

5. The method of claim 1, wherein said at least one sensor is at least one of a visual sensor, an audio sensor, and a biometric sensor.

6. The method of claim 5, wherein said at least one sensor is a plurality of sensors that include a visual sensor, an audio sensor, and a biometric sensor that are part of a cognitive robotic (CR) device.

7. A cognitive robotic device for providing assistance in a student's learning, comprising:
    a memory medium comprising instructions;
    a bus coupled to the memory medium; and
    a processor coupled to the bus that when executing the instructions causes the system to perform a method, comprising:
        identifying a student and each other student of a plurality of other students in a classroom using facial recognition;
        providing the student with a presentation of educational materials on a given topic for study by the student;
        monitoring said student with at least one sensor while the student studies said presentation of educational materials by collecting data from said at least one sensor;
        monitoring the other students along with the student with at least one sensor while the student studies said presentation of educational materials to obtain a set of conditions for each of the plurality of other students;
        obtaining, using cognitive analysis performed by a cognitive system that has self-learning attributes that increase accuracy of determinations as more information and contextual data is provided, a set of conditions in said data from said at least one sensor, each of the set of conditions including a measurable physical manifestation corresponding to at least one level of student understanding of the topic of said presentation of educational materials;
        assigning a learning style of a set of learning styles based on the set of conditions that have been obtained, wherein as least one of the other students is assigned a learning style that is different from a learning style assigned to the student, each of the set of learning styles being selected from a group consisting of: visual learning, audial learning, experiential learning and instructional learning; and
        determining, using cognitive analysis performed by the cognitive system, whether presentation of educational materials satisfies the set of conditions corresponding to said at least one level of student understanding of the topic;

grouping the student with at least one other student that was assigned a common learning style, wherein at least one more other student is grouped into a different group having a different learning style; and altering said provided presentation of educational materials by substituting a current learning module tailored to a first learning style with a new learning module tailored to a second learning style based on said determining of said level of student understanding to cognitively assist in said student's learning.

8. The cognitive robotic device of claim 7, further comprising a database having a plurality of learning plans from which said presentation of educational materials are provided, wherein at least some of said plurality of learning plans comprise a plurality of learning components that are interchangeable among at least some of said learning plans.

9. The cognitive robotic device of claim 7, further comprising a database having a personal history of learning of said student.

10. The cognitive robotic device of claim 9, wherein said cognitive analysis relates said data collected from said at least one sensor to said database having a personal history of learning of said student to estimate a level of student aptitude and provides an alternative presentation of educational materials based on student aptitude.

11. The cognitive robotic device of claim 7, wherein said at least one sensor is a plurality of sensors that include a visual sensor, an audio sensor, and a biometric sensor that are part of a cognitive robotic (CR) device.

12. A computer program product embodied in a computer readable medium that, when executed by a computer device, performs a method for providing assistance in a student's learning, the method comprising:

identifying a student and each other student of a plurality of other students in a classroom using facial recognition;

providing the student with a presentation of educational materials on a given topic for study by the student;

monitoring said student with at least one sensor while the student studies said presentation of educational materials by collecting data from said at least one sensor;

monitoring the other students along with the student with at least one sensor while the student studies said presentation of educational materials to obtain a set of conditions for each of the plurality of other students;

obtaining, using cognitive analysis performed by a cognitive system that has self-learning attributes that increase accuracy of determinations as more information and contextual data is provided, a set of conditions in said data from said at least one sensor, each of the set of conditions including a measurable physical manifestation corresponding to at least one level of student understanding of the topic of said presentation of educational materials;

assigning a learning style of a set of learning styles based on the set of conditions that have been obtained, wherein as least one of the other students is assigned a learning style that is different from a learning style assigned to the student, each of the set of learning styles being selected from a group consisting of: visual learning, audial learning, experiential learning and instructional learning; and determining, using cognitive analysis performed by the cognitive system, whether presentation of educational materials satisfies the set of conditions corresponding to said at least one level of student understanding of the topic;

grouping the student with at least one other student that was assigned a common learning style, wherein at least one more other student is grouped into a different group having a different learning style; and altering said provided presentation of educational materials by substituting a current learning module tailored to a first learning style with a new learning module tailored to a second learning style based on said determining of said level of student understanding to cognitively assist in said student's learning.

13. The computer program product of claim 12, wherein said cognitive analysis comprises querying said database having a plurality of learning plans from which said presentation of educational materials are provided and, wherein at least some of said plurality of learning plans comprise a plurality of learning components that are interchangeable among at least some of said learning plans.

14. The computer program product of claim 12, wherein said cognitive analysis comprises querying a database having a personal history of learning of said student.

15. The computer program product of claim 14, wherein said cognitive analysis relates said data collected from said at least one sensor to said database having personal history of learning of said student to estimate a level of student aptitude and provides an alternative presentation of educational materials based on student aptitude.

16. The computer program product of claim 12, wherein said at least one sensor is at least one of a visual sensor, an audio sensor, and a biometric sensor.

17. The computer program product of claim 16, wherein said at least one sensor is a plurality of sensors that include a visual sensor, an audio sensor, and a biometric sensor that are part of a cognitive robotic (CR) device.

* * * * *